United States Patent
Otani et al.

(10) Patent No.: US 8,280,677 B2
(45) Date of Patent: Oct. 2, 2012

(54) GEOGRAPHICAL DATA COLLECTING DEVICE

(75) Inventors: Hitoshi Otani, Itabashi-ku (JP); Mitsutaka Nakamura, Itabashi-ku (JP)

(73) Assignee: Kabushiki Kaisha TOPCON, Tokyo-to (JP)

(*) Notice: Subject to any disclaimer, the term of this patent is extended or adjusted under 35 U.S.C. 154(b) by 542 days.

(21) Appl. No.: 12/380,225

(22) Filed: Feb. 25, 2009

(65) Prior Publication Data
US 2009/0222237 A1 Sep. 3, 2009

(30) Foreign Application Priority Data
Mar. 3, 2008 (JP) ................. 2008-052250

(51) Int. Cl.
G01C 9/00 (2006.01)
G01C 1/06 (2006.01)
(52) U.S. Cl. ................. 702/152; 356/142
(58) Field of Classification Search ................. 702/152, 702/33, 40, 81, 84, 127, 150–151, 153–159, 702/161–162, 166–167, 170, 172, 182–183, 702/188–189; 356/3, 4.01, 4.03, 4.06–4.08, 356/7–8, 11–12, 14, 138–139, 139.04, 139.07–139.08, 356/139.1, 141.1–141.2, 141.4–141.5, 142, 356/147, 150, 152.1, 153, 243.8, 395–400, 356/625, 628–629, 634–636; 33/1 M, 1 N, 33/1 T, 1 CC, 1 DD, 227, 266–267, 272, 33/275 G, 281–282, 284–286, 331–332, 340–343, 33/351–352, 700, 706–707; 396/20, 50, 396/54, 61–62, 89, 103–104, 121, 124, 138–139, 396/141–143, 155, 164, 175, 204; 382/106, 382/108, 154, 312–313; 348/135–143, 158
See application file for complete search history.

(56) References Cited

U.S. PATENT DOCUMENTS
4,717,251 A  1/1988 Wells et al.
(Continued)

FOREIGN PATENT DOCUMENTS
CN  1445509 A  10/2003
(Continued)

OTHER PUBLICATIONS
Chinese Communication dated Dec. 31, 2010 in corresponding foreign application CN 200910118293.2.
(Continued)

*Primary Examiner* — Toan M Le
(74) *Attorney, Agent, or Firm* — Nields, Lemack & Frame, LLC (57) ABSTRACT

The present invention provides a geographical data collecting device, including a distance measuring unit 5 for projecting a distance measuring light and for measuring a distance to an object to be measured, an image pickup unit 3 for taking an image in a measuring direction, a display unit 6 for displaying an image picked up, a touch panel installed to match a position of screen of the display unit, a tilt sensor 11 for detecting a tilting in a measuring direction, an azimuth sensor 12 for detecting a horizontal angle in the measuring direction, and a control arithmetic unit 8, wherein the control arithmetic unit displays a scale to indicate horizontal and vertical lines on the display unit and controls the scale display so that the scale always indicates the horizontal and the vertical lines in the image based on a result of detection of tilting from the tilt sensor.

7 Claims, 7 Drawing Sheets

U.S. PATENT DOCUMENTS

| | | |
|---|---|---|
| 4,802,757 A | 2/1989 | Pleitner et al. |
| 5,098,185 A | 3/1992 | Watanabe et al. |
| 5,247,356 A * | 9/1993 | Ciampa .................... 348/144 |
| 5,361,217 A | 11/1994 | Makimura et al. |
| 5,539,513 A | 7/1996 | Dunne |
| 5,548,409 A | 8/1996 | Ohta et al. |
| 5,647,015 A | 7/1997 | Choate et al. |
| 5,671,451 A | 9/1997 | Takahashi et al. |
| 5,699,149 A | 12/1997 | Kuroda et al. |
| 5,699,444 A | 12/1997 | Palm |
| 5,913,078 A | 6/1999 | Kimura et al. |
| 5,949,529 A | 9/1999 | Dunne et al. |
| 5,988,862 A | 11/1999 | Kacyra et al. |
| 6,025,790 A | 2/2000 | Saneyoshi |
| 6,093,928 A | 7/2000 | Ohtomo et al. |
| 6,396,571 B2 | 5/2002 | Ohtomo et al. ............ 356/5.1 |
| 6,473,716 B1 | 10/2002 | Ohishi et al. |
| 6,480,148 B1 | 11/2002 | Wilson et al. |
| 6,563,574 B2 | 5/2003 | Ohtomo et al. |
| 6,643,004 B2 * | 11/2003 | Detweiler et al. ......... 356/141.4 |
| 6,859,269 B2 | 2/2005 | Ohtomo et al. |
| 7,256,900 B1 | 8/2007 | Hanaoka |
| 7,804,996 B2 | 9/2010 | Ohtomo et al. |
| 7,933,001 B2 | 4/2011 | Otani et al. |
| 2003/0065446 A1 | 4/2003 | Ootomo et al. |
| 2003/0105400 A1 | 6/2003 | Yawata et al. |
| 2003/0137449 A1 | 7/2003 | Vashisth et al. ......... 342/357.08 |
| 2003/0179361 A1 | 9/2003 | Ohtomo et al. |
| 2004/0037451 A1 | 2/2004 | Kim et al. |
| 2006/0044546 A1 | 3/2006 | Lewin et al. |
| 2006/0167648 A1 | 7/2006 | Ohtani |
| 2006/0192946 A1 | 8/2006 | Walser |
| 2006/0204232 A1 | 9/2006 | Weinberg et al. ............ 396/50 |
| 2007/0008515 A1 | 1/2007 | Otani et al. |
| 2007/0010924 A1 | 1/2007 | Otani et al. ............... 701/35 |
| 2007/0133012 A1 | 6/2007 | Euler |
| 2007/0288197 A1 | 12/2007 | Martin ........................ 702/152 |
| 2009/0022369 A1 | 1/2009 | Satoh et al. |
| 2009/0225161 A1 | 9/2009 | Otani et al. |
| 2011/0096319 A1 | 4/2011 | Otani et al. |

FOREIGN PATENT DOCUMENTS

| | | |
|---|---|---|
| CN | 1896686 A | 1/2007 |
| EP | 0542561 A1 | 5/1993 |
| EP | 1219925 A2 | 7/2002 |
| EP | 1 744 122 | 1/2007 |
| EP | 1744122 A2 * | 1/2007 |
| JP | 1-184411 A | 7/1989 |
| JP | 7-4961 A | 1/1995 |
| JP | 9-210649 A | 8/1997 |
| JP | 10-239055 A | 9/1998 |
| JP | 10-246628 A | 9/1998 |
| JP | 11-148822 A | 6/1999 |
| JP | 2000-131065 A | 5/2000 |
| JP | 2000-171249 A | 6/2000 |
| JP | 2001-503134 A | 3/2001 |
| JP | 2001-91253 A | 4/2001 |
| JP | 2002-39748 | 2/2002 |
| JP | 2002-131057 A | 5/2002 |
| JP | 2002-202126 A | 7/2002 |
| JP | 2002-271654 | 9/2002 |
| JP | 2003-114126 A | 4/2003 |
| JP | 2003-269958 A | 9/2003 |
| JP | 2004-32286 A | 1/2004 |
| JP | 2004-37424 A | 2/2004 |
| JP | 2004-317237 | 11/2004 |
| JP | 2006-10376 A | 1/2006 |
| JP | 2007-248156 | 9/2007 |
| WO | 98/10246 A1 | 3/1998 |
| WO | 2004/083779 A1 | 9/2004 |

OTHER PUBLICATIONS

European communication dated Jun. 5, 2009.
European communication dated Sep. 14, 2010 in co-pending foreign application (EP09002813.5).
Japanese Communication, with English translation, mailed Nov. 22, 2011 in co-pending Japanese Patent Application No. 2006-069804.
Office Action dated Nov. 3, 2011 in co-pending U.S. Appl. No. 12/380,152.
3rd Tech, DeltaSphere-3000 Laser 3D scene Digitizer Brochure, Jun. 22, 2000, 2 pgs.
Honeywell, 3-Axis Compass Sensor Set/HMC 1055 Brochure, 2009, 1 page.
Chinese Communication dated Dec. 5, 2008 in co-pending foreign application CN 200610101533.4, 8 pages.
European Search Report dated Apr. 8, 2008 in co-pending foreign application EP 05022747, 2 pages.
European Communication dated May 8, 2008 in co-pending foreign application EP 06014085.2, 5 pages.
Japanese Communication, with English translation, mailed May 10, 2011 in co-pending Japanese Patent Application No. 2005-202047, 10 pages.
Office Action dated Sep. 5, 2008 in abandoned U.S. Appl. No. 11/204,638, 10 pages.
Final Rejection dated Feb. 23, 2009 in abandoned U.S. Appl. No. 11/204,638, 13 pages.
Office Action dated Nov. 12, 2009 in abandoned U.S. Appl. No. 11/204,638, 15 pages.
Final Rejection dated Jun. 7, 2010 in abandoned U.S. Appl. No. 11/204,638, 16 pages.
Office Action dated Jun. 28, 2011 in co-pending U.S. Appl. No. 12/984,021, 14 pages.
Final Rejection dated Nov. 10, 2011 in co-pending U.S. Appl. No. 12/984,021, 12 pages.

* cited by examiner

GEOGRAPHICAL DATA COLLECTING DEVICE

BACKGROUND OF THE INVENTION

The present invention relates to a portable type geographical data collecting device using GPS. In particular, the invention relates to a geographical data collecting device, by which it is possible to perform a measurement on a coordinate value or the like with respect to an object to be measured, to acquire an image data of a place to be measured, and to collect a result of the measurement together with the image data.

In recent years, the global positioning system (GPS) has been widely propagated, and a present position can be acquired by a GPS device in easy manner and with high accuracy, and the present position can be displayed in a map information.

A simple and convenient geographical data collecting device is desired, by which it is possible to measure easily a position of an object to be measured, to acquire an image data of a measuring point or of the object to be measured, and to move easily, when it is necessary to collect subordinate information in addition to a general map information, for instance, when information such as a position of a manhole on a road or a position of a telephone pole are necessary, or when it is necessary to acquire information such as position and a size of a tree, conditions of a thicket or a bush in a survey on forest or the like, or when it is necessary to acquire information such as a position and a condition of cracking in the ground, or a position, a range, etc. of landslide in a disaster.

In order to cope with such demands, a portable type geographical data collecting device is proposed in the patent publication JP-A-2007-248156.

The geographical data collecting device comprises a GPS device, an image pickup unit, a laser distance measuring unit, a tilt sensor and an azimuth sensor. Using the present position of the geographical data collecting device as acquired by the GPS device as reference, the geographical data collecting device can acquire the position information and the image data of the object to be measured.

By the geographical data collecting device as disclosed in JP-A-2007-248156, the position information relating to the object to be measured and the image data of the surrounding including the object to be measured can be acquired. Further, by designating two points in vertical direction of the object to be measured on the acquired image, a vertical distance can be calculated according to a field angle and a measured horizontal distance to the object to be measured.

In case where a horizontal distance between two points is measured, each of coordinates on the two points have been measured, and the horizontal distance has been calculated from the coordinates of the two points.

SUMMARY OF THE INVENTION

An object of the present invention is to provide a geographical data collecting device, by which it is possible to measure on an image not only a distance in vertical direction but also a distance in horizontal direction in easy manner, and to improve a working condition and a work ability of geographical data collecting operation.

To attain the above object, the geographical data collecting device according to the present invention comprises a distance measuring unit for projecting a distance measuring light and for measuring a distance to an object to be measured, an image pickup unit for taking an image in a measuring direction, a display unit for displaying an image picked up, a touch panel installed to match a position of screen of the display unit, a tilt sensor for detecting a tilting in a measuring direction, an azimuth sensor for detecting a horizontal angle in the measuring direction, and a control arithmetic unit, the control arithmetic unit displays a scale to indicate horizontal and vertical lines on the display unit and controls the scale display so that the scale always indicates the horizontal and the vertical lines in the image based on a result of detection of tilting from the tilt sensor.

Also, the present invention provides the geographical data collecting device as described above, wherein the control arithmetic unit measures a distance between two points based on an image including the object to be measured, based on a result of a distance measurement to the object to be measured as acquired at the distance measuring unit, on two points designated along the scale, and on a field angle between the two points. Further, the present invention provides the geographical data collecting device as described above, wherein the two points are designated along the scale to indicate a vertical line and a vertical distance between the two points is measured. Also, the present invention provides the geographical data collecting device as described above, wherein the two points are designated along the scale to indicate a horizontal line and a horizontal distance between the two point is measured. Further, the present invention provides the geographical data collecting device as described above, wherein a scale value is also displayed on the scale, and the scale value is changed to match the measured distance. Further, the present invention provides the geographical data collecting device as described above, wherein there is further comprised a GPS device, and the control arithmetic unit calculates a three-dimensional coordinates of the measuring point based on a geographical data obtained by the GPS device, on an azimuth angle of the measuring point measured by the azimuth sensor, and on a result of a distance measurement.

The present invention provides a geographical data collecting device, comprising a distance measuring unit for projecting a distance measuring light and for measuring a distance to an object to be measured, an image pickup unit for taking an image in a measuring direction, a display unit for displaying an image picked up, a touch panel installed to match a position of screen of the display unit, a tilt sensor for detecting a tilting in a measuring direction, an azimuth sensor for detecting a horizontal angle in the measuring direction, and a control arithmetic unit, wherein the control arithmetic unit displays a scale to indicate horizontal and vertical lines on the display unit and controls the scale display so that the scale always indicates the horizontal and the vertical lines in the image based on a result of detection of tilting from the tilt sensor. As a result, it is possible to easily judge the vertical and the horizontal of an object to be measured, and by aligning the object to be measured with the scale, it is possible to easily perform a measurement while the geographical data collecting device is held in a vertical position and in a horizontal position with respect to the object to be measured.

Also, the present invention provides the geographical data collecting device as described above, wherein the control arithmetic unit measures a distance between two points based on an image including the object to be measured, based on a result of a distance measurement to the object to be measured as acquired at the distance measuring unit, on two points designated along the scale, and on a field angle between the two points. Thus, there is no need to carry out the measurement separately on each of the two points. As a result, a moving of the operator and a measuring operation at a plurality of measuring points can be omitted, and a work ability is greatly improved.

Further, the present invention provides the geographical data collecting device as described above, wherein a scale value is also displayed on the scale, and the scale value is changed to match the measured distance. As a result, it is possible to judge promptly an approximate size of the object to be measured.

Also, the present invention provides the geographical data collecting device as described above, further comprising a GPS device, wherein the control arithmetic unit calculates a three-dimensional coordinates of the measuring point based on a geographical data obtained by the GPS device, on an azimuth angle of the measuring point measured by the azimuth sensor, and on a result of a distance measurement. As a result, it is possible to acquire the three-dimensional data of the measuring point easily and to collect the geographical data with high efficiency.

BRIEF DESCRIPTION OF THE DRAWINGS

FIGS. 4A-4B are drawings each showing an image obtained in the embodiment of the present invention and a scale bar displayed in the image. FIG. 4A shows a case of a short distance, and FIG. 4B shows a case of a long distance;

DETAILED DESCRIPTION OF THE PREFERRED EMBODIMENT

A description will be given below on the best mode for carrying out the present invention by referring to the attached drawings.

First, referring to FIG. 1, a description will be given on a geographical data collecting device, to which the present invention is carried out.

Figure 1:
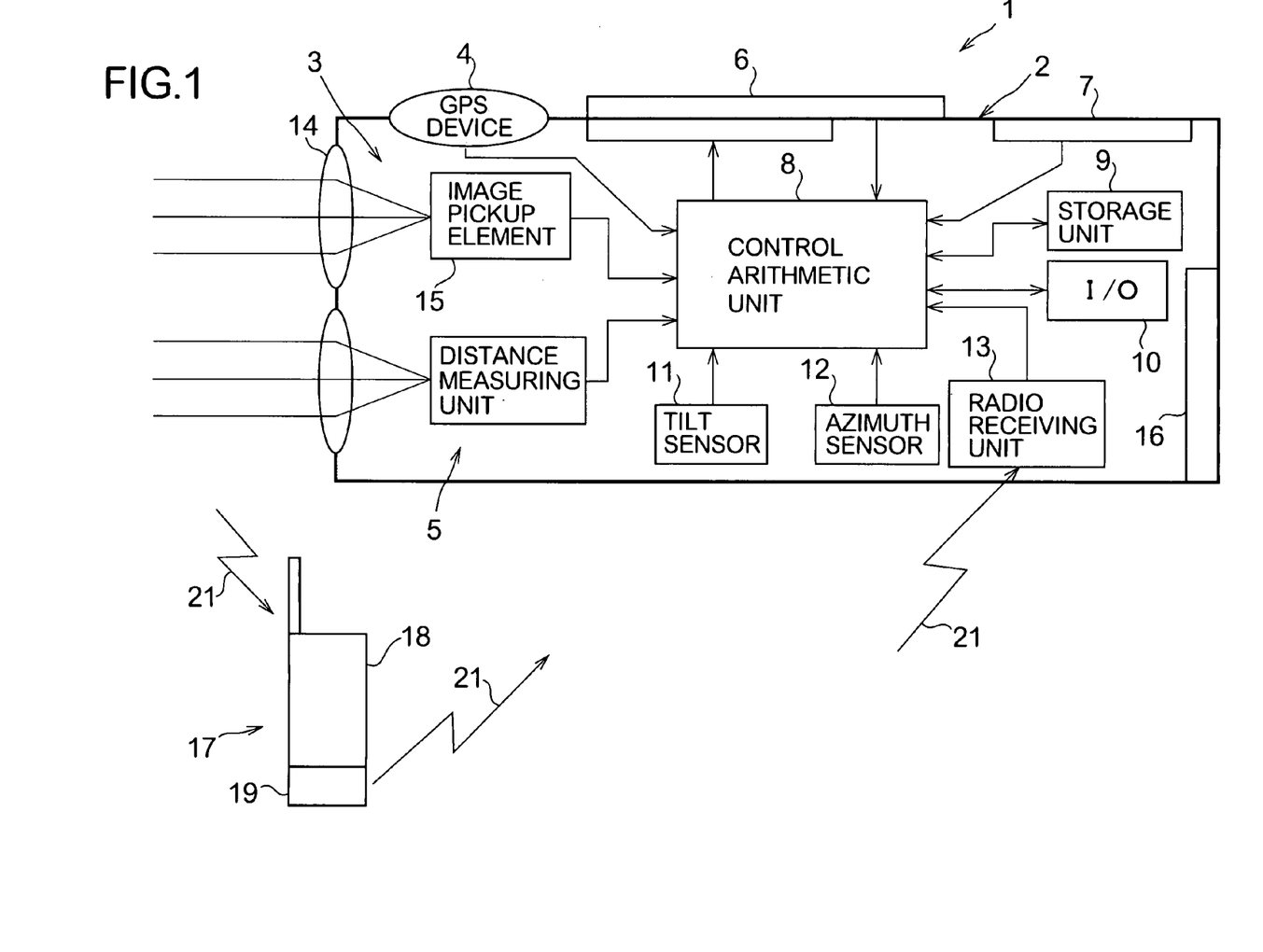
FIG. 1 is a schematical block diagram to show an example of a geographical data collecting device, to which the present invention is carried out.

In FIG. 1, reference numeral 1 denotes a geographical data collecting device, and numeral 2 represents a portable type housing. In the housing 2, there are provided an image pickup unit 3, a GPS device, a distance measuring unit 5, a display unit 6 and an operation unit 7. Inside the housing 2, there are provided a control arithmetic unit 8, a storage unit 9, an input/output control unit 10, a tilt sensor 11, an azimuth sensor 12, and a radio receiving unit 13. The image pickup unit 3 is a digital camera, for instance. The image pickup unit 3 comprises an objective lens 14 and an image pickup element 15, which is an aggregate of a multiple of pixels such as CCD, CMOS sensor, etc. The image pickup element 15 can identify an address of each individual pixel (a position in the image pickup element). An image of an object, formed on the image pickup element 15, is outputted from the image pickup element 15 to the control arithmetic unit 8 as a digital image signal, and the image is stored in the storage unit 9 via the control arithmetic unit 8. In the figure, reference numeral 16 denotes a chargeable battery or a dry cell used as a power source of the geographical data collecting device 1.

The distance measuring unit 5 has a non-prism type electro-optical (light wave) distance measuring instrument. A distance measuring light is projected to an object to be measured, and by receiving a reflection light from the object to be measured, a distance to the object to be measured can be measured. The distance measuring light may be an infrared light or a visible light. When the visible light is used, the measuring point can be visually identified.

The display unit 6 is to display the image thus picked up and the display unit 6 is designed as a touch panel. An operator can perform the processing as necessary from the display unit 6. The operation unit 7 has operation buttons as necessary (not shown). The buttons are, for instance, power on-off buttons for turning the power on and off, shutter buttons for taking the image, display switchover buttons for switching over display screens, measurement buttons for performing measurement, and other types of buttons. The desired proceedings can be carried out by operation of these buttons.

A display screen of the display unit 6 can be designed as one-screen or as two screens or more divided according to an image display program.

Figure 2:
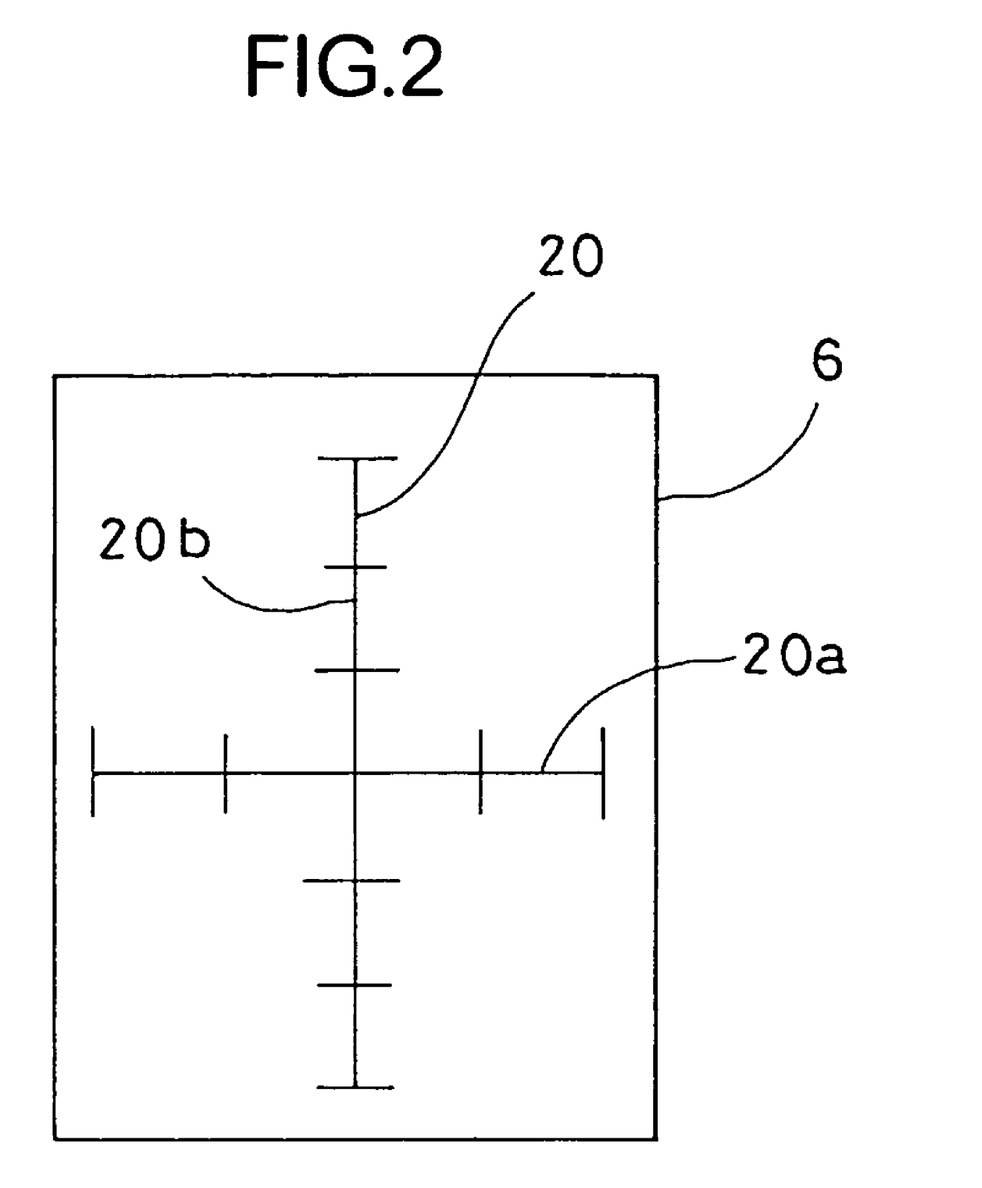
FIG. 2 is an explanatory drawing to show an example of a display of a display unit provided in the geographical data collecting device.

FIG. 2 shows a case where the display unit 6 is a one-screen display. On the screen, a scale bar 20 in form of a cross is displayed. An intersection of the scale bar 20 is positioned at a center of the display image, and the intersection indicates a measuring point, i.e. a collimating point of the distance measuring unit 5.

The display of the scale bar 20 is linked with an operation of the tilt sensor 11. A transverse bar 20a indicates a horizontal line, and a longitudinal bar 20b indicates a vertical line. Therefore, in a condition that the geographical data collecting device 1 is tilted, the scale bar 20 is displayed as the scale bar 20 is tilting with respect to the display unit 6. In a condition that the geographical data collecting device 1 is at horizontal position, the scale bar 20 is displayed in an erected state in the display unit 6 as shown in FIG. 2.

The scale display is so designed that graduation value corresponding to a horizontal distance to the measuring point is displayed. In case where the measuring point is at a long distance, the distance indicated by one graduation is long. In case where the measuring point is at a short distance, the distance indicated by one graduation is short.

The storage unit 9 has a storage medium (not shown), and data can be written or read via the control arithmetic unit 8. In the storage medium, various types of programs for operating the geographical data collecting device 1 are provided. These programs include, for instance: a sequence program for performing the measurement, an image processing program for processing the image taken, a measurement compensating program for compensating the measurement data by GPS based on compensation information described hereafter, an image display program for displaying the data, the image and the scale bar 20 on the display unit 6, a calculation program for calculating a graduation value of the scale bar 20 based on the measured distance to the object to be measured and on a field angle, for calculating a tilting of the scale bar 20 based on a result of a measurement by the tilt sensor 11, and for calculating a distance or an area from a plurality of points designated on the image, a communication program for performing a communication with a compensation information receiver 18 described hereafter, and other programs.

The storage medium may comprise an internal storage medium such as semiconductor memory, HD, etc., which are accommodated and fixed in the geographical data collecting device 1, and a portable storage medium, which is removably attached on the storage unit 9. As the portable storage medium, a small type storage medium is used, which is typically represented by a memory card or the like, and can be accommodated in the geographical data collecting device 1. As an auxiliary storage unit, an external storage unit such as an external HD unit, which can be connected to the geographical data collecting device 1, may be used.

The input/output control unit 10 can be connected to an external processing unit, e.g. a personal computer (PC) and can output the data stored in the storage unit 9 to the PC. Also, the input/output control unit 10 can output the data from the PC to the storage unit 9, and the input/output control unit 10 can also write or rewrite various types of programs as described above in the storage unit 9. Geographical data such as map data including at least the geographical point of the object to be measured are inputted in advance to the storage unit 9 via the input/output control unit 10.

The control arithmetic unit 8 develops the programs stored in the storage unit 9 and displays an image acquired by the image pickup element 15 on the display unit 6. Also, the control arithmetic unit 8 calculates a tilting condition of the scale bar 20 based on the tilting data obtained at the tilt sensor 11, displays the scale bar 20 on the display unit 6, and controls a distance measurement of the distance measuring unit 5. Further, the control arithmetic unit 8 calculates a horizontal distance to the object to be measured, calculates an area and three-dimensional coordinates based on the distance measurement data obtained at the distance measuring unit 5 and on an angle measurement data obtained at the tilt sensor 11 and the azimuth sensor 12 and controls a communication with the radio receiving unit 13.

During the distance measurement and the data collecting by the geographical data collecting device 1, the tilt sensor 11 detects a tilting of the geographical data collecting device 1 with respect to the horizontal position and inputs the result to the control arithmetic unit 8. The control arithmetic unit 8 displays the tilting condition of the geographical data collecting device 1 on the display unit 6 as a tilting of the scale bar 20.

A simple type magnetic azimuth sensor (compass) is used, as the azimuth sensor 12, and the azimuth sensor 12 detects a direction of optical axis of the objective lens 14, i.e. an image pickup direction of the image pickup unit 3—namely, the measuring direction. The result of the detection is inputted to the control arithmetic unit 8, and the control arithmetic unit 8 appropriately displays the azimuth on the display unit 6.

The radio receiving unit 13 receives GPS measurement compensating information as transmitted from the compensation information transmitter/receiver 17, to be described hereafter and sends a compensation information 21 to the control arithmetic unit 8.

In general, at a single position measurement by a GPS device, factors of errors are included, which are caused from the reasons such as propagation delay in ionosphere or in the atmosphere, and measurement accuracy is in a range of about 10 meters to 50 meters. Therefore, there are D-GPS (Differential GPS) and RTK-GPS (Real-Time Kinetic GPS) measurement accuracy of which are improved. D-GPS receives the compensation information 21 obtained by electric wave or medium wave beacon of FM broadcasting issued from a standard station of which the exact position is known and uses the compensation information 21. As a result, the measurement accuracy can be improved from several tens of cm to several meters. In the RTK-GPS as described above, signals which are received and acquired at the same time at a fixed point and a moving point, serving as a reference. The received signals are transferred to the moving point by using means such as a radio device. By determining the position on the moving point side, the measurement accuracy can be improved to the extent of about 1 centimeter to 2 centimeters. VRS-GPS (virtual reference system GPS) is called as a virtual reference point system. From observation data at a plurality of electronic reference points, a condition is created as if there is a reference point near the actual site of surveying, and the surveying operation with high accuracy can be accomplished by using a single VRS-GPS receiver. The device according to the present invention is a handy type small integrated geographical data collecting device 1. When the accuracy is not an important factor, it may be preferable to install a D-GPS device, for instance, which is easier to use.

The compensation information transmitter/receiver 17 comprises the compensation information receiver 18 and the compensation information transmitter 19. The compensation information 21 can be received by a handy phone, and the handy phone can be used in simple manner as the compensation information receiver 18. The compensation information 21 received by the compensation information receiver 18 may be transmitted to the radio receiving unit 13 by using transmission function of the handy phone. Or, the compensation information transmitter 19 may be provided as shown in the figure, and the compensation information 21 may be transmitted to the radio receiving unit 13 by the compensation information transmitter 19. Some of the handy phones are provided with Bluetooth (registered trademark) function, and for the transmission of the compensation information 21, Bluetooth radio system may be adopted for the transmission of large-capacity data in short distance.

Now, referring to the figures from FIG. 3 to FIG. 7, a description will be given below on the operation of the geographical data collecting device according to the present invention.

When the geographical data collecting device 1 is used, the geographical data collecting device 1 is held by an operator. The operator supports the device by one hand and operates the operation unit 7 by the other hand.

First, a description will be given on a case where a coordinate position and a vertical distance of the object to be measured, e.g. a tree, are measured.

Figure 3:
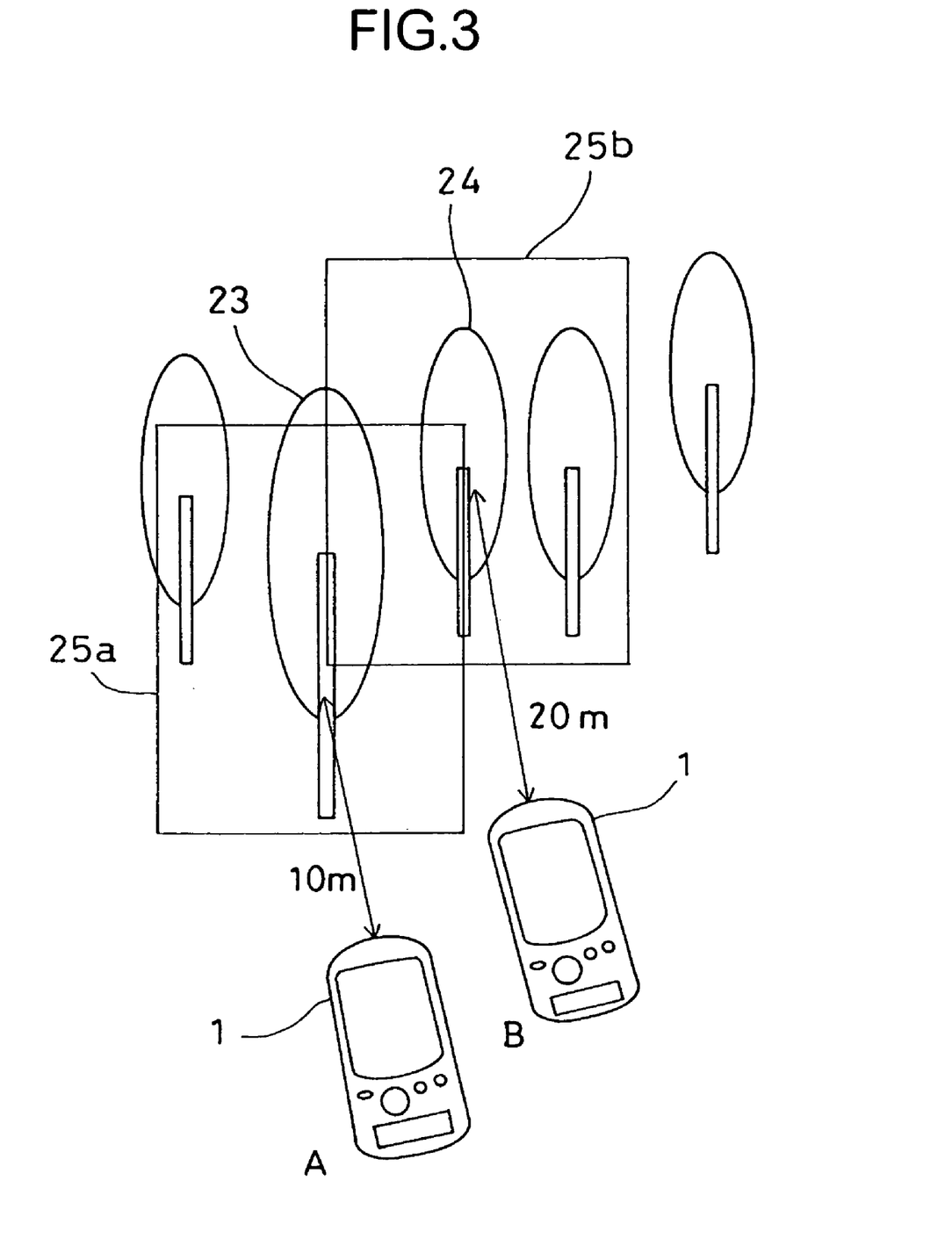
FIG. 3 is an explanatory drawing to show a measuring condition in an embodiment of the present invention.
Figure 5:
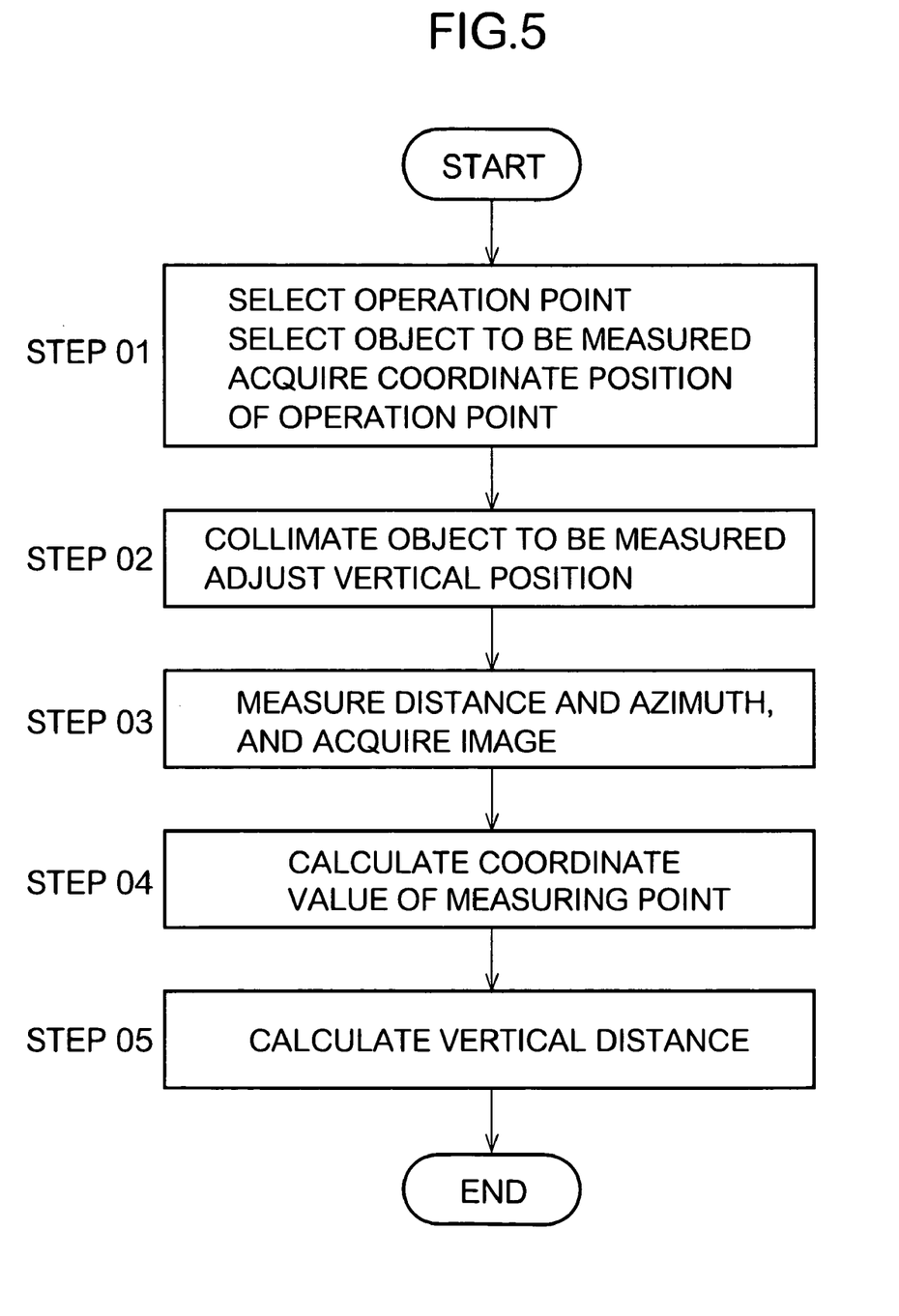
FIG. 5 is a flowchart to show an operation in case a vertical distance is measured in the embodiment of the present invention.

(Step 01) An operator is positioned at an operation point A (which is to become a reference point of the measurement) and selects an object to be measured 23. A coordinate position of the operation point is acquired by the GPS device 4, and the coordinate position of the operation point is recorded in the storage unit 9.

(Step 02) The geographical data collecting device 1 is directed toward the object to be measured 23 (i.e. a collimation is performed). A direction and a tilting of the geographical data collecting device 1 are adjusted and the longitudinal bar 20*b* of the scale bar 20 is aligned with the object to be measured 23. The longitudinal bar 20*b* matches the tilt sensor 11 and always indicates the vertical line. Accordingly, when the object to be measured 23 is aligned with the longitudinal bar 20*b*, it is recognized that the object to be measured 23 is at vertical position. That is, a verticality of the object to be measured 23 can be confirmed by the longitudinal bar 20*b*.

Figure 4A:
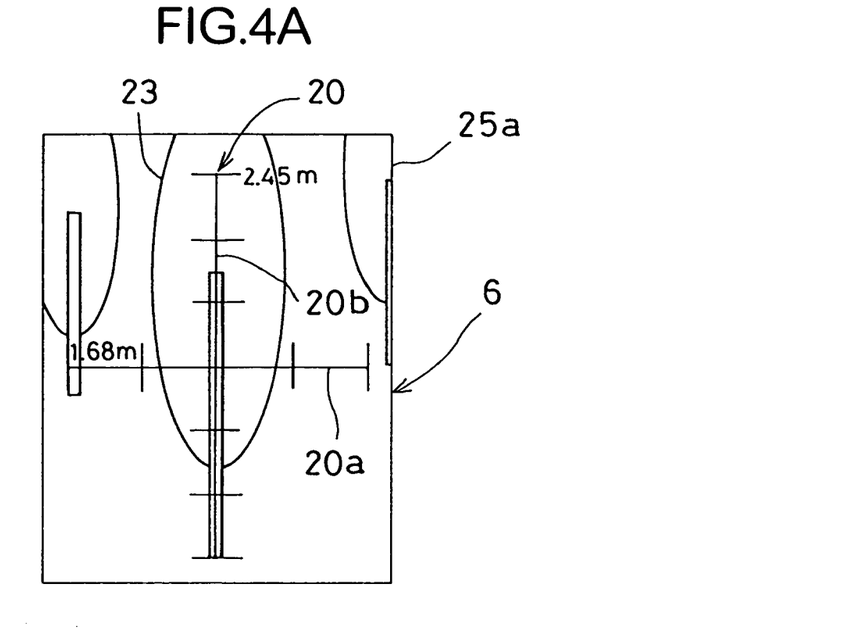

(Step 03) The operation unit 7 is operated, and a distance measurement to the object to be measured 23 and a measurement of the azimuth are performed, and an image of the object to be measured 23 is acquired by the image pickup unit 3. In FIG. 3, reference symbols 25*a* and 25*b* each represents an image pickup range. The image pickup range 25a from the operation point A is displayed on the display unit 6 as shown in FIG. 4A.

When the distance to the object to be measured 23 is obtained, a vertical distance per pixel can be calculated from a field angle per pixel of the image pickup element 15. As a result, a distance per graduation of the longitudinal bar 20b can be calculated, and a numeral value of the scale is displayed based on the result of calculation. Based on the result of calculation, a length per graduation may be lengthened or shortened.

In the figure, the distance to the object to be measured 23 is 10 meters, and three graduations of the longitudinal bar 20b correspond to 2.45 meters, and two graduations of the transverse bar 20a correspond to 1.68 meters.

(Step 04) Based on the coordinate value of the operation point A, on the measured distance (horizontal distance) to the object to be measured 23, and on an azimuth angle obtained by the azimuth sensor 12, a coordinate value of the object to be measured 23 is calculated. The coordinate value is associated with the image and the coordinate value and the image are recorded in the storage unit 9.

(Step 05) The image of the object to be measured 23 is displayed on the display unit 6. By designating two points along the longitudinal bar 20b in the object to be measured 23, a distance in vertical direction, i.e. a height of the tree, can be calculated based on a field angle in vertical direction and based on a horizontal distance to the object to be measured 23.

When the measuring operation on the object to be measured 23 is completed, the operator moves to an operation point B and selects an object to be measured 24. Then, the operation of Step 01 to Step are carried out on the object to be measured 24, and the measurement is performed on the object to be measured 24. In case the measured distance to the object to be measured 24 is 20 meters, the numerical value of the scale on the scale bar 20 is changed so that three graduations on the longitudinal bar 20b correspond to 5.75 meters, and two graduations on the transverse bar 20a correspond to 3.28 meters (see FIG. 4B).

Figure 4B:
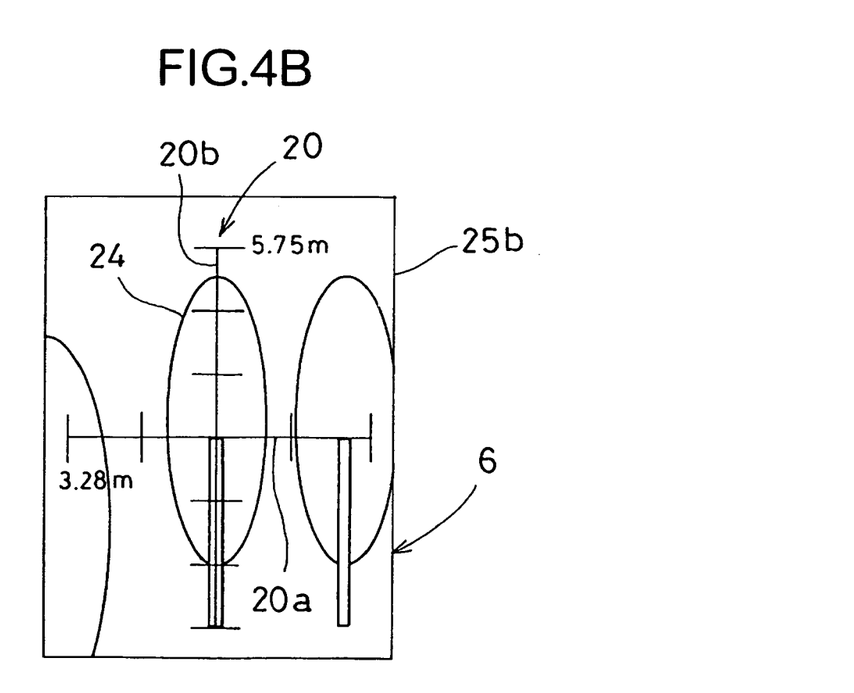

Therefore, by reading the graduation value, an approximate size of the object to be measured can be promptly judged.

Next, referring to FIG. 6 and FIG. 7, a description will be given on a case where the horizontal distance is measured.

Figure 6:
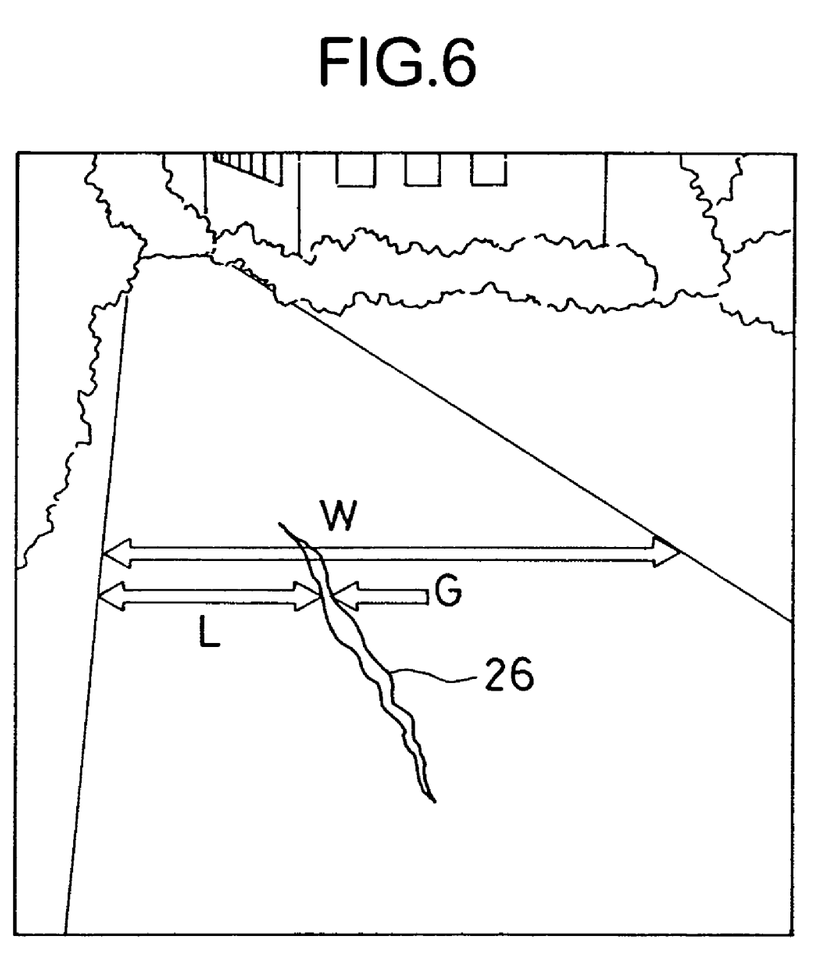
FIG. 6 is an explanatory drawing to show a case where a horizontal distance is measured in the embodiment of the present invention.
Figure 7:
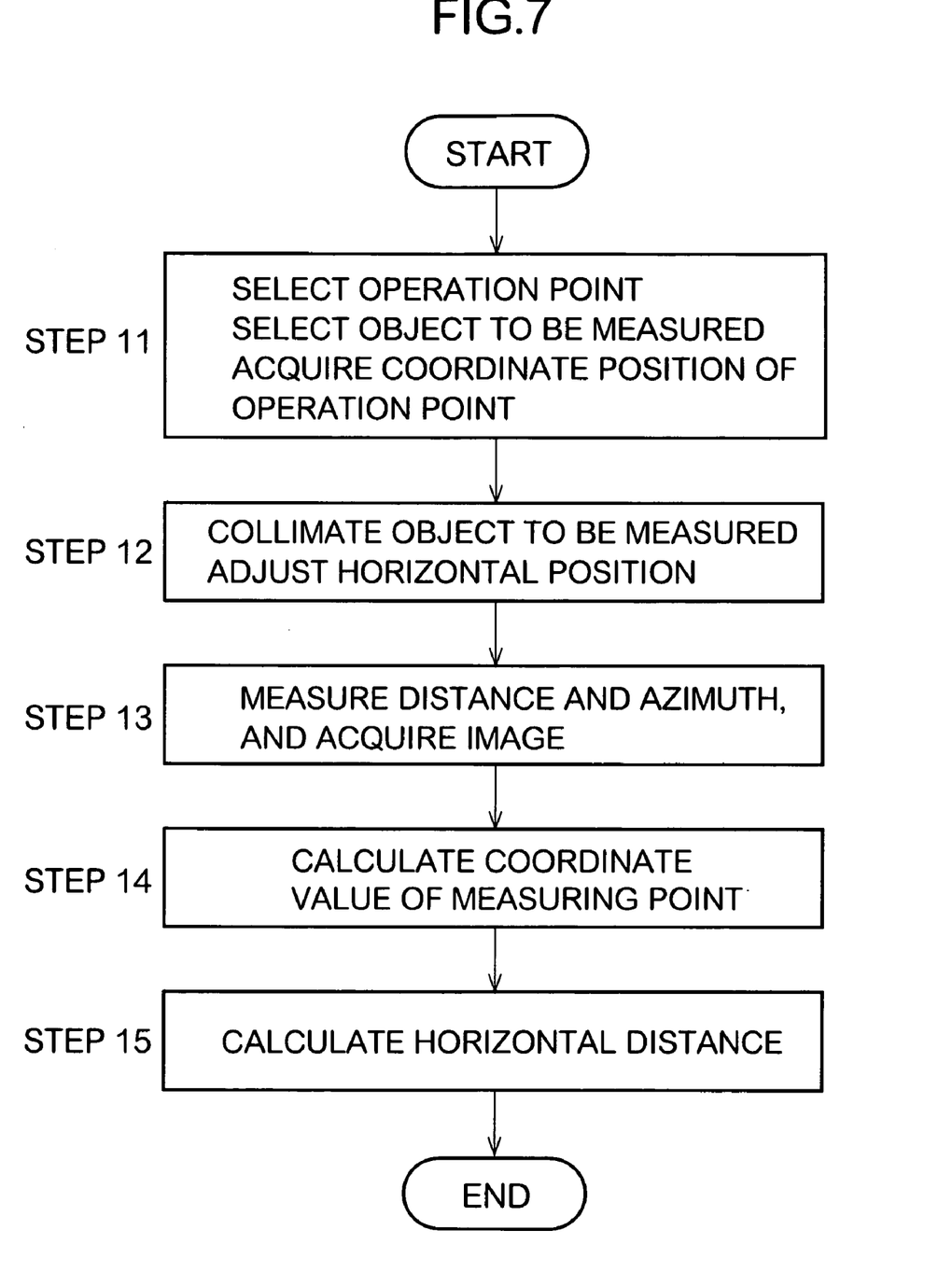
FIG. 7 is a flowchart to show an operation in case a horizontal distance is measured in the embodiment of the present invention.

Examples in FIG. 6 and FIG. 7 each shows a case where a position and a width of a crack are measured when the crack occurs on a road.

The same procedure as that of the measurement of the vertical distance is performed in case the horizontal distance is measured.

(Step 11) The operator selects an operation point. A coordinate position of the operation point is acquired by the GPS device 4, and is recorded in the storage unit 9.

(Step 12) The geographical data collecting device 1 is directed toward the object to be measured, e.g. to a crack 26. A direction and a tilting of the geographical data collecting device 1 are adjusted, and the transverse bar 20a of the scale bar 20 is aligned with a width direction of the road. Because the transverse bar 20a matches the tilt sensor 11 and always indicates horizontal line, a direction and a posture of the tilt sensor 11 are adjusted so that the width direction of the road is aligned with the transverse bar 20a. By the transverse bar 20a, a horizontality of the object to be measured can be confirmed.

(Step 13) Under the condition that the width direction of the road and the transverse bar 20a are aligned with each other, the operation unit 7 is operated, and a distance measurement to the crack 26 and an azimuth measurement of the crack are performed and an image including the crack 26 is acquired by the image pickup unit 3. The image data thus acquired is recorded in the storage unit 9.

When the distance to the crack 26 is obtained, a horizontal distance per pixel can be calculated according to the field angle per pixel of the image pickup element 15. Accordingly, a distance per each graduation of the transverse bar 20a can be calculated. Based on the result of calculation, numerical value of the scale is displayed (see FIGS. 4A and 4B).

(Step 14) The coordinate value of the crack 26 can be calculated based on the coordinate value of the operation point, on the measured distance (horizontal distance) from the operation point to the crack 26, and on the azimuth angle obtained by the azimuth sensor 12. Then, the coordinate value is associated with the image and is recorded in the storage unit 9.

(Step 15) An image of the crack 26 is displayed on the display unit 6. By specifying two points along the transverse bar 20a in the object to be measured, a distance in horizontal direction, i.e. a distance L from the end of the road to the crack 26 and a width G of the crack 26 can be calculated based on the field angle in horizontal direction and also based on the horizontal distance to the crack 26.

Therefore, there is no need to perform the measurement on a plurality of points when the horizontal distance is measured. By designating the two points in the image, the horizontal distance can be promptly determined and the work ability is greatly improved.

Also, when the horizontal distance is measured, an approximate value of the horizontal distance can be identified intuitively.

The invention claimed is:

1. A geographical data collecting device, comprising a distance measuring unit for projecting a distance measuring light and for measuring a distance to an object to be measured, an image pickup unit for taking an image in a measuring direction, a display unit for displaying an image picked up, a touch panel installed to match a position of screen of said display unit, a tilt sensor for detecting a tilting in the measuring direction, an azimuth sensor for detecting a horizontal angle in the measuring direction, and a control arithmetic unit, wherein said control arithmetic unit displays a scale to indicate horizontal and vertical lines on the display unit and controls the scale display so that said scale always indicates the horizontal and the vertical lines in the image based on a result of detection of tilting from said tilt sensor.

2. A geographical data collecting device according to claim 1, wherein said control arithmetic unit measures a distance between two points based on an image including an object to be measured, based on a result of a distance measurement to the object to be measured as acquired at said distance measuring unit, based on two points designated along said scale, and based on a field angle between said two points.

3. A geographical data collecting device according to claim 2, wherein said two points are designated along said scale to indicate a vertical line and a vertical distance between said two points is measured.

4. A geographical data collecting device according to claim 2, wherein said two points are designated along said scale to indicate a horizontal line and a horizontal distance between said two points is measured.

5. A geographical data collecting device according to claim 1, wherein a scale value is also displayed on said scale, and said scale value is changed to match the measured distance.

6. A geographical data collecting device according to claim 1, further comprising a GPS device, wherein said control arithmetic unit calculates a three-dimensional coordinates of the measuring point based on a geographical data obtained by said GPS device, on an azimuth angle of the measuring point measured by said azimuth sensor, and on a result of a distance measurement.

7. A geographical data collecting device according to claim 6, further comprising a radio receiving unit, a compensation information 21 is received by said radio receiving unit, and a measurement result measured by said GPS device is compensated based on said compensation information.

* * * * *